United States Patent [19]

Black

[11] 3,882,380

[45] May 6, 1975

[54] HIGH VOLTAGE COMPONENT TESTING SYSTEMS

[75] Inventor: Ian Alexander Black, Worthing, Sussex, England

[73] Assignee: F. C. Robinson & Partners Limited

[22] Filed: Feb. 7, 1973

[21] Appl. No.: 330,324

[30] Foreign Application Priority Data
Feb. 10, 1972 United Kingdom.............. 6173/72

[52] U.S. Cl............................................. 324/60 C
[51] Int. Cl........................................... G01r 27/26
[58] Field of Search ...................... 324/60 C, 57 R

[56] References Cited
UNITED STATES PATENTS
2,121,725  6/1938  Baumzweiger .................... 324/60 C
3,387,208  6/1968  Foley ................................ 324/60 C

*Primary Examiner*—Stanley T. Krawczewicz
*Attorney, Agent, or Firm*—Irving M. Weiner

[57] ABSTRACT

Apparatus and method for testing electrical components for partial electric discharges which occur in such components, but which do not bridge the electrodes of such components. The electrical components to be tested are connected to monitoring units whose outputs are in turn connected to a comparator circuit, such as an AND gate. The comparator circuit compares the outputs from the monitoring units to determine whether a predetermined polarity or time relationship indicative of a partial discharge has been satisfied. Such relationship is dependent upon the configuration of the testing circuit.

17 Claims, 6 Drawing Figures

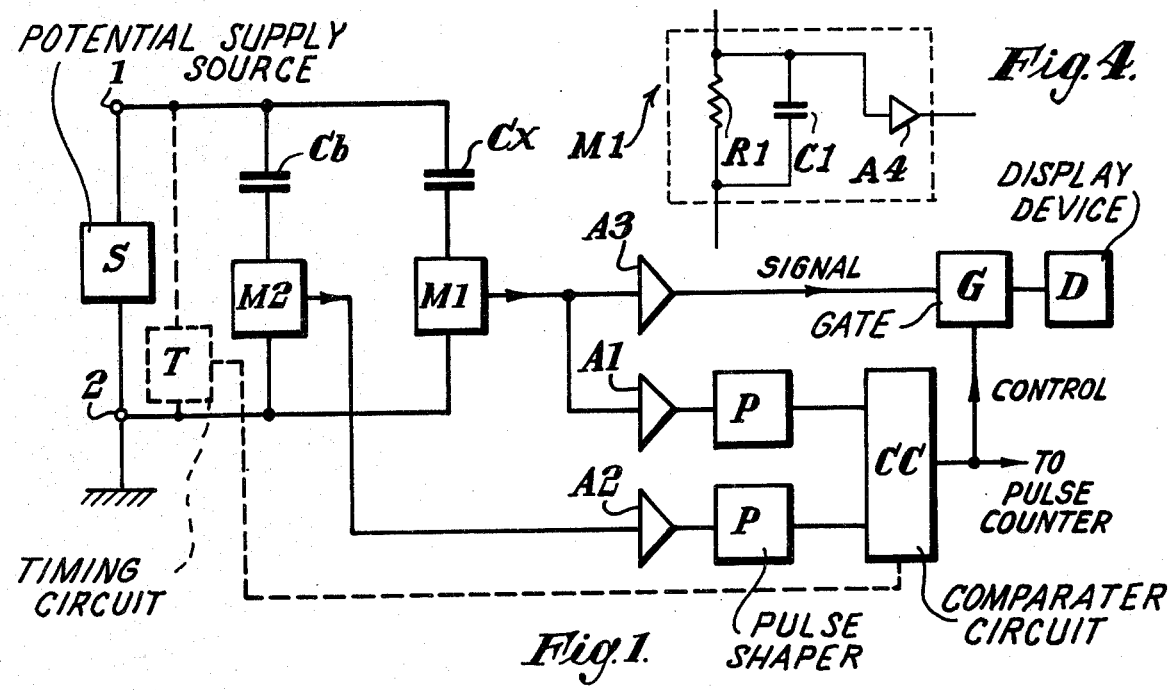
Fig. 1.
Fig. 4.
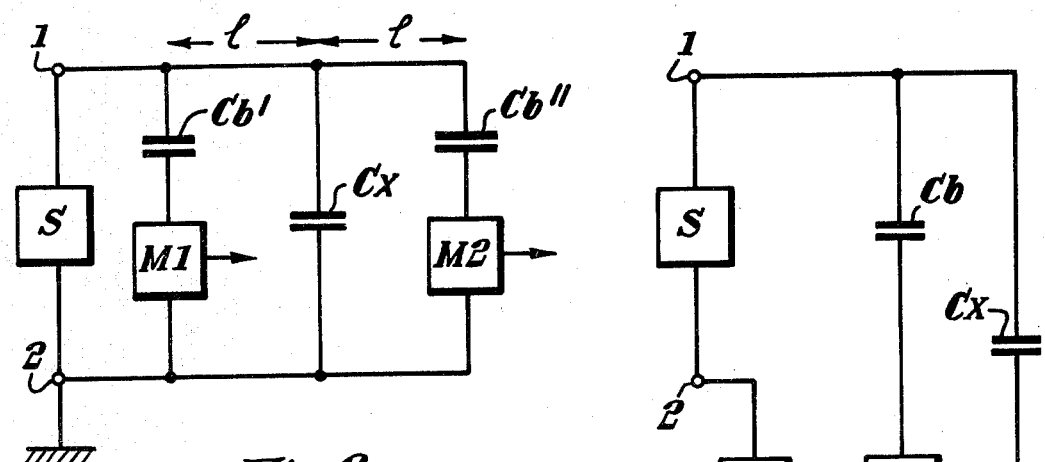
Fig. 2.
Fig. 3.
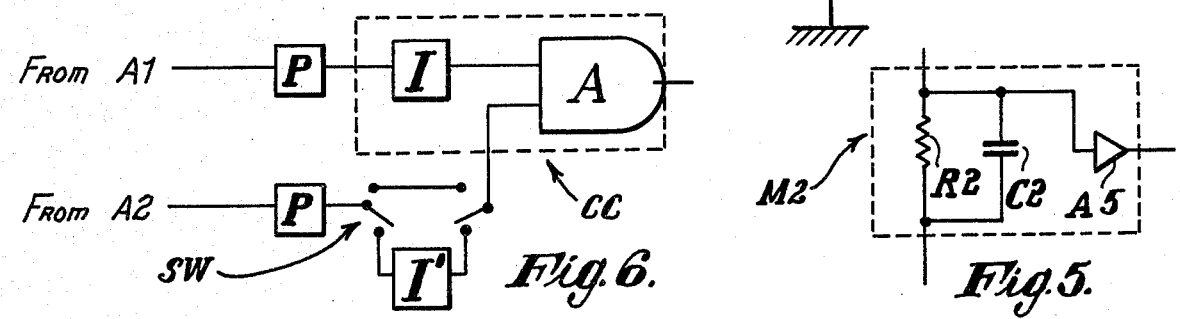
Fig. 6.
Fig. 5.

HIGH VOLTAGE COMPONENT TESTING SYSTEMS

The invention relates to high voltage component testing systems.

In many of the components employed in high voltage equipment, such as capacitors, cables, bushings and transformers, it is necessary to avoid electrical breakdown caused by the phenomena, hereinafter referred to as a "partial discharge", where an electric discharge occurs which does not bridge the electrodes, for example, internal discharges in cavities in a dielectric, surface discharges along an insulator, and corona discharges around a sharp edge. Partial discharges of this type are discussed in detail in the text book entitled "Discharge Detection in High Voltage Equipment", by F.H. Kreuger, a Heywood book published by Temple Press Books Ltd. in 1964.

One object of the present invention is to provide an improved method of and system for testing for partial discharge in high voltage components.

According to one aspect, the invention consists in a method of testing an electrical component for any partial discharge (as hereinbefore defined) comprising connecting two separate monitoring units into a circuit arrangement comprising a component to be tested and two terminals of a potential supply source, each of said monitoring units being connected between said two terminals via a respective electrical component, one of which may be the component to be tested, and wherein the output of each monitoring unit is fed to a separate input of a comparator circuit which compares the respective polarities or time relationship of pulses produced by said monitoring units, and the circuit arrangement being such that the polarity or time relationship of pulses caused by any external transient voltage fluctuations imposed upon said potential supply source differs from the corresponding relationship of any respective pulses produced by a partial discharge in any said component within said circuit arrangement, said comparator circuit being such that it responds to produce an output pulse only in the event of the latter type of pulse relationship, and not in the event of pulses caused by external transients.

Where it is convenient to connect a monitoring unit in series with the component to be tested, it will obviously be desirable to insert the monitoring unit in that side of the circuit which is at or nearer earth potential.

In this case one monitoring unit is so connected preferably between one electrode of the component to be tested and an earth point, whilst the other monitoring unit is connected in series with a reference component in a parallel arm between the supply terminals. In this case external transients produce pulses of the same polarity at the outputs of the monitoring unit, whilst any pulses due to a partial discharge in the component under test or in the reference component are of mutually opposite polarity and the comparator circuit is adapted to identify the relevant pulses by responding only to simultaneously occurring pulses of mutually opposite polarity.

If it is not convenient to introduce a monitoring unit between the component to be tested and an earth point, then one monitoring unit may be connected between the earth side terminal of the potential source and an earth point to which the component to be tested is connected, and the other monitoring unit is connected in series with a reference component between said earth point and the other terminal of the potential source. In this case the one monitoring unit is in series with two parallel arms, one containing the component to be tested and the other containing a reference component in series with the second monitoring unit. In this case external transients will produce mutually-opposed output pulses whilst any partial discharge will produce pulses of the same polarity and the comparator circuit is designed accordingly.

If it is inconvenient to connect a monitoring unit in series at any point between the supply terminals and the component to be tested, then the two monitoring units may be connected in series with respective reference components in separate shunt arms, one having connections positioned at a point nearer the supply terminals than the component to be tested, and the other connected across the component to be tested via a connection path equal in length to that between the component to be tested and the one shunt arm. In this case external transients will produce pulses from the monitoring units which have the same polarity but are relatively displaced in time, whilst any pulses due to a partial discharge will have similar polarity but will occur simultaneously so that the comparator circuit is designed to respond to coincident pulses only.

According to another aspect, the invention consists in a high voltage component testing system for the detection of any partial discharge (as hereinbefore defined), said system comprising two monitoring units for connection in a circuit arrangement formed between two potential supply terminals and including a component to be tested, each of said monitoring units having an output terminal connected to an associated input of a comparator circuit that is adapted to produce an output pulse only in the event of the pulses from the two monitoring units having a predetermined polarity or time relationship.

The comparator circuit may include selective switching means to adapt it for operation in accordance with any one of a plurality of different relationships, i.e. to respond either to simultaneous pulses of opposed polarity, or to simultaneous pulses of the same polarity.

Each monitoring unit may include a series impedance element and an impedance matching amplifier for coupling the series impedance to a cable providing connection to the comparator circuit. A pulse shaping circuit may be connected in series with each comparator circuit input.

Further aspects and features of the invention will now be described with reference to the drawings, in which:

FIG. 1 is a block schematic representation of one preferred embodiment of a system in accordance with the invention;

FIG. 2 is a block schematic representation of part of a further preferred embodiment;

FIG. 3 is a block schematic circuit diagram of part of yet another preferred embodiment;

FIGS. 4 and 5 show the elements of monitoring units M1 and M2, respectively; and FIG. 6 shows the elements of the comparator circuit.

In the embodiment illustrated in FIG. 1, a pair of terminals, 1 and 2, provide connection to a potential supply source S, which in this case is a high voltage a.c. source. A component to be tested, in this case a capacitor Cx, is connected between the terminals 1 and 2 via a monitoring unit M1, which comprises a series impedance such as a resistor R1 and capacitor C1 connected in parallel and an impedance matching amplifier A4. If desired, such series impedance may be formed by the parallel combination of an inductor or a capacitor and a damping resistor. All the elements of M1 can be seen in FIG. 4. In this embodiment the terminal 2 is at earth potential, and the monitoring unit M1 has an output terminal which produces a potential which is dependent at any instant upon the supply potential and the characteristics of the test component $C_x$. Thus, in the event of any partial discharge in the dielectric of the capacitor $C_x$, a transient pulse will appear at the output of the monitoring unit M1, and in known test systems the output of this unit may be fed directly or via an impedance matching transformer to a cable leading to a display device D, such as a cathode ray oscilloscope positioned at a safe distance from the high voltage equipment. However, such a known system will also display transient pulses that are introduced via the supply source.

In this illustrated embodiment of the invention, the monitoring unit M1 incorporates an impedance matching amplifier A4 and its output is fed via a length of cable to an amplifier A1, and hence to one input of a comparator circuit CC. There is a further component $C_b$, which may be a reference component, or in some cases a further component to be tested, connected between the terminals 1 and 2 via a second monitoring unit M2 (comprising amplifier A5 and a series impedance, such as resistor R2) and capacitor C1, said components of M2 being shown in FIG. 5, whose output is supplied by an internal impedance matching amplifier A5 to a cable leading to a second amplifier A2, and hence to the second input of the comparator circuit CC. The comparator circuit CC is arranged to produce an output signal if pulses of opposite polarity appear simultaneously at its inputs, thus it may comprise and AND gate with an inverter stage, I, connected in series with one input, as can be seen in FIG. 6.

The output of the comparator circuit CC may be fed to a pulse counter to give a simple count of the number of partial discharges occurring in the component $C_x$, (assuming that the component $C_b$ is a high grade reference component) or it may give a total count of all partial discharge if both the components $C_x$ and $C_b$ are to be tested. In the latter case, it is possible to distinguish between pulses produced by one or other of the components by reference to the polarity in each channel. Assuming that the partial discharge occurs in the component $C_x$ during the positive-going flank of a supply cycle, then the pulse produced by the monitoring unit M1 will be a positive pulse, and that produced by the monitoring unit M2 will be a negative pulse, since the internal loop current flowing from $C_x$ via $C_b$ will pass through the monitoring unit M2 in the opposite direction. Therefore, by including polarity-sensitive means it is possible to ascertain whether a partial discharge has occurred in the component $C_x$ or $C_b$ at any given instant.

It will be readily apparent that in the circuit arrangement shown in FIG. 1 of the drawings, any transient pulses superimposed upon the supply source will appear with the same polarity at the outputs of the monitoring units M1 and M2, and will therefore not produce an output from the comparator circuit CC.

In this illustrated embodiment individual pulse shaping circuits P are provided between the monitoring units and the respective inputs of the comparator circuit, to assist in a positive recognition of the transient signals produced by any partial discharges. The monitoring units and/or their associated amplifiers may be frequency-selective, to eliminate low frequencies, such as 50 Hz and its significant harmonies, by having a lower cut-off at say 10 kHz, or to respond in a given frequency band, for example, a band centered upon a frequency of 50 KHz.

The gain of one or both amplifiers may be made adjustable, to enable selective recording of pulses above a predetermined threshold value.

As shown in FIG. 1 of the drawings, the output of the comparator circuit may be used to control a gate G, that is connected in a path from a monitoring unit to a display device D, such as a cathode ray oscilloscope, via a further amplifier A3 and an associated cable. In this way, a display of partial discharge pulses can be obtained, for either of the components $C_x$ and $C_b$, with the complete elimination of any transient pulses that arrive via the supply terminals 1 and 2. For computer analysis, the output of both or either monitoring unit may be converted into digital form and stored or recorded via a gate G controlled by the comparator circuit CC.

If the invention is to be employed in a situation where the low voltage terminal of the component to be tested is required to be at earth potential, each monitoring unit could be inserted in the high voltage side, but this is obviously an undesirable solution. FIG. 2 shows one possible solution to overcome this disadvantage, in which two reference components $C_b'$ and $C_b''$ are connected via connecting leads of equal length on either side of the component $C_x$ that is to be tested, i.e. one at a point nearer the supply terminals and one more remote, and each of these components having a monitoring unit connected in its earthy side. In this case the internal pulses produced by a partial discharge in the unit $C_x$ will produce simultaneous pulses of the same polarity from the monitoring units M1 and M2, which are connected to a circuit arrangement similar to that shown in FIG. 1, whilst transient pulses appearing via the supply will produce pulses of the same polarity but at different times, so that the latter will not trigger the comparator circuit CC, which in this case need not be specially arranged to select oppositely-poled pulses.

Alternatively, if the supply terminal 2 of the source S can be disconnected from earth, the monitoring unit M1 may be connected between that terminal and the junction of the paths via the components $C_x$ and $C_b$, as shown in FIG. 3 of the drawings, in which case the comparator CC will be required to respond to simultaneous pulses of one polarity, since externally introduced transients will produce simultaneous output pulses of opposed polarity, whilst internally produced pulses due to any partial discharge will produce pulses of the same polarity.

In the last mentioned case, one monitoring unit is connected in a common path feeding the two components, one component being directly in parallel with the combination of the other component and its associated monitoring unit.

Thus, the embodiments described enable external pulses to be eliminated, even if the two components have very different values (since compensation can be obtained in subsequent amplifier circuits), and the use of a discharge-free reference component is not essential, since two such components can be simultaneously but individually tested by polarity sensing. Furthermore, the application of a logic gating circuit enables testing to be performed in situations where it is not possible to insert a monitoring unit in the earth connection to a component.

The supply source S may be a d.c. or an a.c. source, and where the supply is an a.c. source, the comparator circuit CC can be controlled by a timing circuit T to be effective only during a particular part of the supply cycle, to facilitate in distinguishing between discharges in the components, as is shown by the broken-line connections in FIG. 1. This feature applies equally to the embodiments shown in FIGS. 2 and 3.

To modify the comparator circuit for the alternative working conditions, it is only necessary to provide an inverter which may be switched in to the path of one input, as and when required. Such a switching arrangement can be seen in FIG. 6, in which inventor, I may be switched into the comparator circuit cc by means of switch, SW. Various known logic circuit combinations may be employed to meet the recognition requirements, and further description of the comparator circuit CC is therefore not required.

It will be appreciated that the proposed method and system not only permits the positive elimination of externally produced transients, but can be used to perform simultaneous testing of two components to be effected, since the reference component does not have to be of a type that is free from partial discharge, and even the testing of components in situ is made possible.

Furthermore, the elimination of external pulses remains effective even in cases where Cb and Cx have very different values.

Although the aforementioned timing means or timing circuit T is shown in FIG. 1 in block schematic form, FIG. 4 shows the details of such timing means which are provided to selectively render the comparator circuit CC effective during a predetermined part of any supply cycle, when operating in connection with an A.C. supply source. The timing means T includes a series arrangement of a diode D1, a resistor R3 and a capacitor C1 connected across the terminals 1 and 2 of an A.C. supply source S. A Zener diode D2 is connected in parallel with the capacitor C1. A resistor R4 is connected between the cathode of the diode D1 and terminal 2 of the source S. A Schmitt trigger circuit TC is supplied with inputs A and B. Input A is taken from the junction between the diode D1 and the resistor R3. Input B is taken from the junction between resistor R3 and capacitor C1. The diode D2 produces a reference voltage limit for the input B. The trigger circuit TC produces an output at the instant in the positive half-cycle when the potential of input A continues to rise, while input B is held steady by the action of the diode D2. The output of the trigger circuit TC is fed to a one-shot multivibrator MV which produces an output for a predetermined duration after receiving the output pulse from the trigger circuit TC. The output of the multibibrator MV is fed to the comparator circuit CC.

What I claim as my invention and desire to secure by letters patent of the United States is:

1. A method of testing an electrical component for any partial discharge comprising connecting two separate monitoring units into a circuit arrangement comprising a component to be tested and two terminals of a potential supply source, each of said monitoring units being connected between said two terminals via a respective electrical component, one of which may be the component to be tested, and wherein the output of each monitoring unit is fed to a separate input of a comparator circuit which compares the respective polarities or time relationship of pulses produced by said monitoring units, and the circuit arrangement being such that the polarity or time relationship of pulses caused by any external transient voltage fluctuations imposed upon said potential supply source differs from the corresponding relationship of any respective pulses produced by a partial discharge in any said component within said circuit arrangement, said comparator circuit being such that it responds to produce an output pulse only in the event of the latter type of pulse relationship, and not in the event of pulses caused by external transients.

2. A method as claimed in claim 1, in which said electrical component to be tested is connected in series with one of said monitoring units, and this combination is connected between said two source terminals in parallel with the series combination of a further electrical component and the other of said monitoring units, said comparator being a coincidence gate responsive to simultaneous pulses of opposite polarity.

3. A method as claimed in claim 2, in which said further electrical component is a reference component.

4. A method as claimed in claim 2, in which said further electrical component is another component that is to be tested.

5. A method as claimed in claim 1 in which one terminal of said electrical component to be tested is connected to earth, and said component is connected between said source terminals via one of said monitoring units, whilst the series combination of a reference electrical component and the other of said monitoring units is connected in parallel with said electrical component to be tested, said comparator being a coincidence gate responsive to simultaneous pulses of the same polarity.

6. A method as claimed in claim 1, in which said two monitoring units are connected in series with respective reference components in separate shunt arms in parallel with said component to be tested, one of said shunt arms having its connections positioned at a point nearer the supply terminals than the component to be tested, and the other being connected across said component via a connection path equal in length to that between the component to be tested and said one shunt arm, said comparator being a coincidence gate responsive to simultaneous pulses only.

7. A method as claimed in claim 1, in which each of said monitoring units comprises a series impedance and an impedance matching amplifier for coupling the series impedance to a cable for connection to said comparator circuit.

8. A method as claimed in claim 7, in which a separate pulse shaping circuit is connected in series with each input of said comparator circuit.

9. A method as claimed in claim 1, in which said potential source is an a.c. source.

10. A method as claimed in claim 9, in which means are provided to render said comparator circuit effective only during a predetermined part of the supply cycle.

11. Apparatus for use in a method of testing as claimed in claim 1, in which two monitoring units are provided for connection in a circuit arrangement formed between two potential supply terminals and including the component to be tested, each of said monitoring units having an output terminal connected to an associated input of a comparator circuit that is adapted to produce an output pulse only in the event of the pulses from the two monitoring units having a predetermined polarity or time relationship.

12. Apparatus as claimed in claim 11, in which said comparator is formed by a coincidence gate having a negator at one input.

13. Apparatus as claimed in claim 11, in which said comparator is a coincidence gate adapted to respond upon receipt of simultaneous pulses at its inputs.

14. Apparatus as claimed in claim 11, in which each said monitoring unit is connected to said comparator circuit via an amplifier and pulse shaper.

15. Apparatus as claimed in claim 11, in which each said monitoring unit comprises a series impedance and an impedance matching amplifier.

16. Apparatus as claimed in claim 11, in which timing means are provided to selectively render said comparator circuit effective during a predetermined part of any supply cycle, when operating in connection with an a.c. supply source.

17. Apparatus as claimed in claim 11, in which the output of said comparator is connected to control a gate which is connected between the output of said monitoring units and a display device.

* * * * *